(12) United States Patent
Cardona

(10) Patent No.: US 10,617,202 B1
(45) Date of Patent: Apr. 14, 2020

(54) MULTIPURPOSE EASEL

(71) Applicant: Kevin Cardona, Santa Fe Springs, CA (US)

(72) Inventor: Kevin Cardona, Santa Fe Springs, CA (US)

(*) Notice: Subject to any disclaimer, the term of this patent is extended or adjusted under 35 U.S.C. 154(b) by 0 days.

(21) Appl. No.: 15/995,395

(22) Filed: Jun. 1, 2018

(51) Int. Cl.
| | |
|---|---|
| *A47F 5/12* | (2006.01) |
| *A47B 27/02* | (2006.01) |
| *G09B 11/06* | (2006.01) |
| *A47B 27/16* | (2006.01) |
| *H02J 7/00* | (2006.01) |

(52) U.S. Cl.
CPC ............... *A47B 27/02* (2013.01); *A47B 27/16* (2013.01); *G09B 11/06* (2013.01); *H02J 7/00* (2013.01); *H02J 2007/0062* (2013.01)

(58) Field of Classification Search
CPC .......... A47B 27/02; A47B 27/16; G09B 11/06
See application file for complete search history.

(56) References Cited

U.S. PATENT DOCUMENTS

| | | | | |
|---|---|---|---|---|
| 1,838,558 A | * | 12/1931 | Kolodny | A47B 13/16 312/348.3 |
| 4,631,643 A | | 12/1986 | Koster | |
| 4,856,749 A | | 8/1989 | Habermann | |
| 8,020,829 B1 | * | 9/2011 | Tamayori | F16M 11/14 108/144.11 |
| 8,245,650 B1 | * | 8/2012 | McKsymick | A47B 3/10 108/25 |
| D681,851 S | * | 5/2013 | Zidek | D25/67 |
| 2003/0005607 A1 | * | 1/2003 | O'Hanlon | A47B 97/04 40/367 |
| 2009/0032479 A1 | * | 2/2009 | Robinson | B43M 99/001 211/11 |
| 2009/0154079 A1 | * | 6/2009 | Bae | A47B 21/00 361/679.02 |
| 2014/0310941 A1 | * | 10/2014 | Anderson | F21V 33/0012 29/458 |
| 2018/0279770 A1 | * | 10/2018 | Crowe | A47B 9/16 |

* cited by examiner

*Primary Examiner* — Matthew W Ing
(74) *Attorney, Agent, or Firm* — Sanchelima & Associates, P.A.; Christian Sanchelima; Jesus Sanchelima

(57) ABSTRACT

A multipurpose easel includes a generally rectangular base element mounted on a detachable support assembly. The generally rectangular base element includes one or more display surfaces configured to indicate information, for example, time, reminders, notes, etc. The generally rectangular base element houses a lightbox configured to provide a tracing surface on the generally rectangular base element. Further, the multipurpose easel comprises one or more storage compartments for storing a plurality of objects, for example, attachment elements, palettes, coloring agents, art supplies, etc. The multipurpose easel includes a universal service bus (USB) interface port for connecting an electronic device.

12 Claims, 4 Drawing Sheets

MULTIPURPOSE EASEL

BACKGROUND OF THE INVENTION

1. Field of the Invention

The present disclosure generally relates to art support devices. More particularly, the present disclosure relates to a multipurpose easel for supporting painting surfaces, displaying paintings, and storing art supplies.

2. Description of the Related Art

Typically, painting canvases ranging from small to large sizes require a support structure called an easel. Several easels have been devised over the years based on utility requirements and sizes of the paintings to be painted and are therefore known in the prior art. For instance, U.S. Pat. No. 4,856,749 by Patrick R. Habermann, discloses an expandable easel, which can hold canvases of varying sizes and shapes. Although the disclosed easel comprises telescopically extendable components, the easel does not include storage or provisions to facilitate the painting process. An easel, which can accommodate canvases of diverse sizes and can store art supplies required for the painting process, is required.

With the creation of the lightbox, creating paintings with higher detail using tracing techniques became possible for the average artist. The lightbox uses illumination from beneath or behind a translucent surface to provide a detailed view of a painting positioned on the translucent surface to a viewer. Several lightboxes have been disclosed in the prior art. For instance, U.S. Pat. No. 4,631,643 by Detlef Koster discloses a demountable multipurpose light table. The invention comprises a storage case configured to house one or more light tables mountable on a telescopic support stand. Although the prior art discloses a height adjustable light table, the prior art does not disclose retractable storage compartments for storing art supplies, which can be easily accessed. Further, the prior art fails to disclose a support assembly on which canvases of diverse sizes may be mounted. An easel, which includes a lightbox in addition to accessible storage compartments and expandable support means for canvases of diverse sizes, is therefore required.

Hence, there is a long felt but unresolved need for an easel, which can accommodate canvases of diverse sizes and can store art supplies required for the painting process. Furthermore, there is a need for an easel, which includes a lightbox in addition to accessible storage compartments and expandable support means for canvases of diverse sizes.

SUMMARY OF THE INVENTION

The invention, disclosed herein, addresses the above-mentioned need for an easel, which can accommodate canvases of diverse sizes and can store art supplies required for the painting process. Furthermore, there is a need for an easel, which includes a lightbox in addition to accessible storage compartments and expandable support means for canvases of diverse sizes.

It is an object of the present invention to address the need to provide display surfaces to detachably attach reminders, notes. Additionally, it is another object of the present invention to provide a graphical user interface displaying time and date.

The present invention, disclosed herein, comprises a generally rectangular base element mounted on a support assembly. The generally rectangular base element includes one or more display surfaces configured to indicate information, for example, time, reminders, notes, etc. The generally rectangular base element houses a lightbox configured to provide a tracing surface on the generally rectangular base element. Further, the multipurpose easel comprises one or more storage compartments for storing a plurality of objects, for example, attachment elements, palettes, coloring agents, art supplies, etc. The multipurpose easel includes a universal service bus (USB) interface port for connecting an electronic device.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
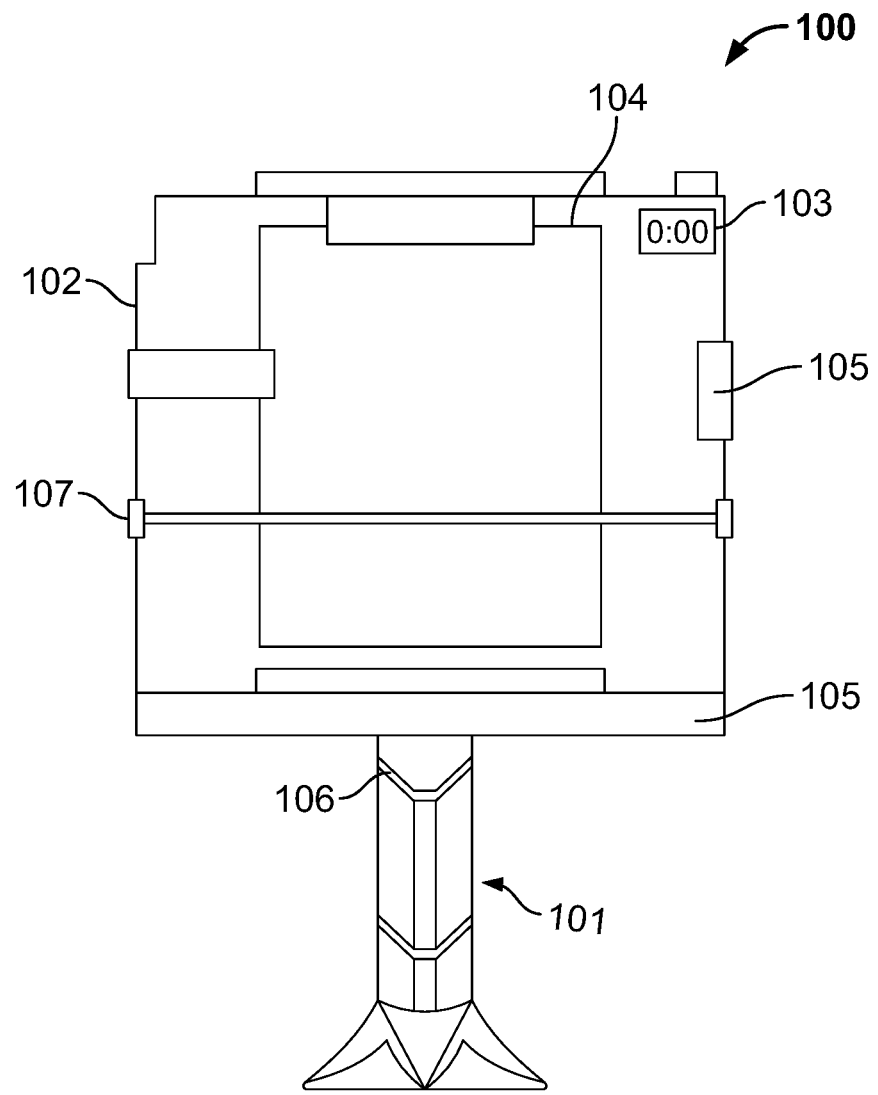
FIG. 1 exemplarily illustrates a front view of a multipurpose easel mounted on a support assembly in a portrait orientation.

FIG. 1 exemplarily illustrates a front view of a multipurpose easel 100 mounted on a support assembly 101 in a portrait orientation. The multipurpose easel 100 includes a generally rectangular base element 102 mounted on a detachable support assembly 101. In an embodiment, the generally rectangular base element 102 may be configured in a square geometrical configuration or other similar configurations based on utility and design requirements. The generally rectangular base element 102 includes one or more display surfaces 103 configured to indicate information, for example, time, reminders, notes, etc. In an embodiment, the time is shown using a programmable digital or an analog dial and may additionally include a graphical user interface indicating a programmable calendar. The generally rectangular base element 102 houses a lightbox 104 configured to provide a tracing surface on the generally rectangular base element 102. As used herein, a "lightbox" refers to a translucent surface which is often illuminated from behind or beneath the translucent surface. The lightbox 104 is illuminated using lighting elements, for example, light emitting diodes (LEDs), etc., when a shape or artform must be viewed in higher contrast. Additionally, the lightbox 104 is used as a tracing surface to draw objects in higher detail. In an embodiment, the lightbox 104 is controlled using a dimmer switch and can be switched off or on based on the requirement of the user. In an embodiment, the generally rectangular base element 102 is detachably attached to the detachable support assembly 101 via a ball and socket joint. As such, the generally rectangular base element 102 is oriented in a portrait or landscape mode and is swiveled 360 degrees on demand. Moreover, built in quality speakers, tablet holders, and a separate attachment for cell phone holders are provided. The speakers can be connected via an auxiliary cable or Bluetooth or similar means. In an embodiment, the rear of the multipurpose easel 100 is padded with foam material to provide an improved ergonomic feel to the device.

Further, the multipurpose easel 100 comprises one or more storage compartments 105 for storing a plurality of objects, for example, attachment elements, palettes, coloring agents, art supplies, etc. The storage compartments 105 include clip holders and retractable trays. The attachment elements include fasteners, clips, pins, etc. The storage compartments 105 have a push feature for opening and are provided at multiple locations on the generally rectangular base element 102. The retractable tray 105 positioned proximal to the lower end of the multipurpose easel 100 is provided to securely store palettes, coloring agents and other art supplies. The retractable tray 105 may be extended in an open configuration to provide access to the art supplies when a canvas is mounted on the multipurpose easel 100 to be painted. The multipurpose easel 100 includes a universal service bus (USB) interface port 106 for connecting or charging an electronic device. The electronic device includes but are not limited to devices, for example, smartphones, tablets, hard drives, etc. The multipurpose easel 100 further comprises a ruler 107 to assist the artist in his/her drawing. The support assembly 101 may be of an A-frame or H-frame configuration based on the size of the canvas to be mounted on the multipurpose easel 100. In an embodiment, the support assembly 101 is extendable to receive canvases ranging from 2 ft. to 8 ft.

Figure 2A:
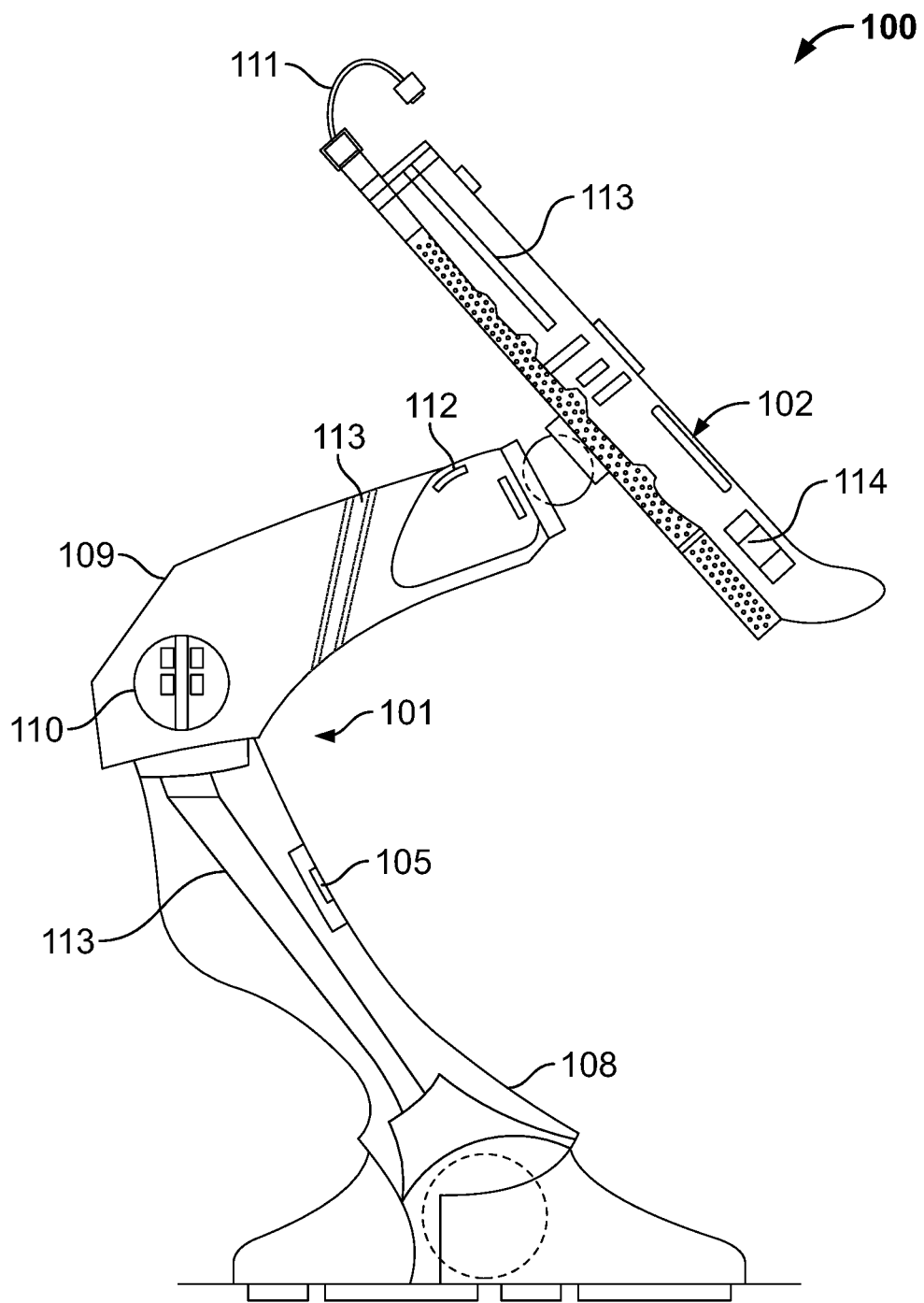
FIG. 2A exemplarily illustrates a side view of a multipurpose easel.

FIG. 2A exemplarily illustrates a side view of a multipurpose easel 100. The multipurpose easel 100 comprises a detachable support assembly 101. In an embodiment, the detachable support assembly 101 is made of 3 components attached together. Since the support assembly 101 is detachable in nature, the multipurpose easel 100 is easily dismantled and allows for easy packing during travel thereby making the multipurpose easel 100 highly portable. The detachable support assembly 101 comprises a primary support member 108 configured to support the external load of the intermediate support member 109 and the generally rectangular base element 102. The primary support member 108 is configured to grip an external surface via rubber grips provided on a lower surface of the primary support member 108. The intermediate support member 109 is detachably attached to the primary support member 108 at one end and the generally rectangular base element 102 at the other end. The intermediate support member 109 is configured to move in an upward and a downward direction. The intermediate support member 109 is configured to rotatably position the generally rectangular base element 102 base on the preference of the user. In an embodiment, the intermediate support member 109 is detachably attached to the generally rectangular base element 102 via a ball and socket joint.

In accordance with an embodiment, the multipurpose easel 100 further comprises a positioning actuator 110 for suitably positioning the rectangular base element 102, the primary support member 108, and the intermediate support member 109. For example, the positioning actuator 110 is a switch which can be operated manually. Alternately, the positioning actuator 110 is an electronic device with touch screen capabilities configured to position the rectangular base element 102, the primary support member 108, or the intermediate support member 109 suitably. As such, the electronic device may be programmable, and store preferred positions selected by the user. The multipurpose easel 100 also comprises a retractable light element 111. The retractable light element 111 is preferably provided at an upper end of the rectangular base element 102. When the retractable light element 111 is not in use, it may be pushed into a cavity configured in the rectangular base element 102. In accordance with an embodiment, the multipurpose easel 100 comprises a pencil sharpener 112 housed in the intermediate support member 109. Additionally, multiple light emitting diodes 113 (LEDs) are provided in one or more locations of the multipurpose easel 100, for example, the rectangular base element 102, the intermediate support member 109, and the primary support member 108, as exemplarily illustrated in FIG. 2A. A dimmer switch 114 is provided on the side of the rectangular base element 102 for adjusting illumination of the lightbox 104 exemplarily illustrated in FIG. 1.

Figure 2B:
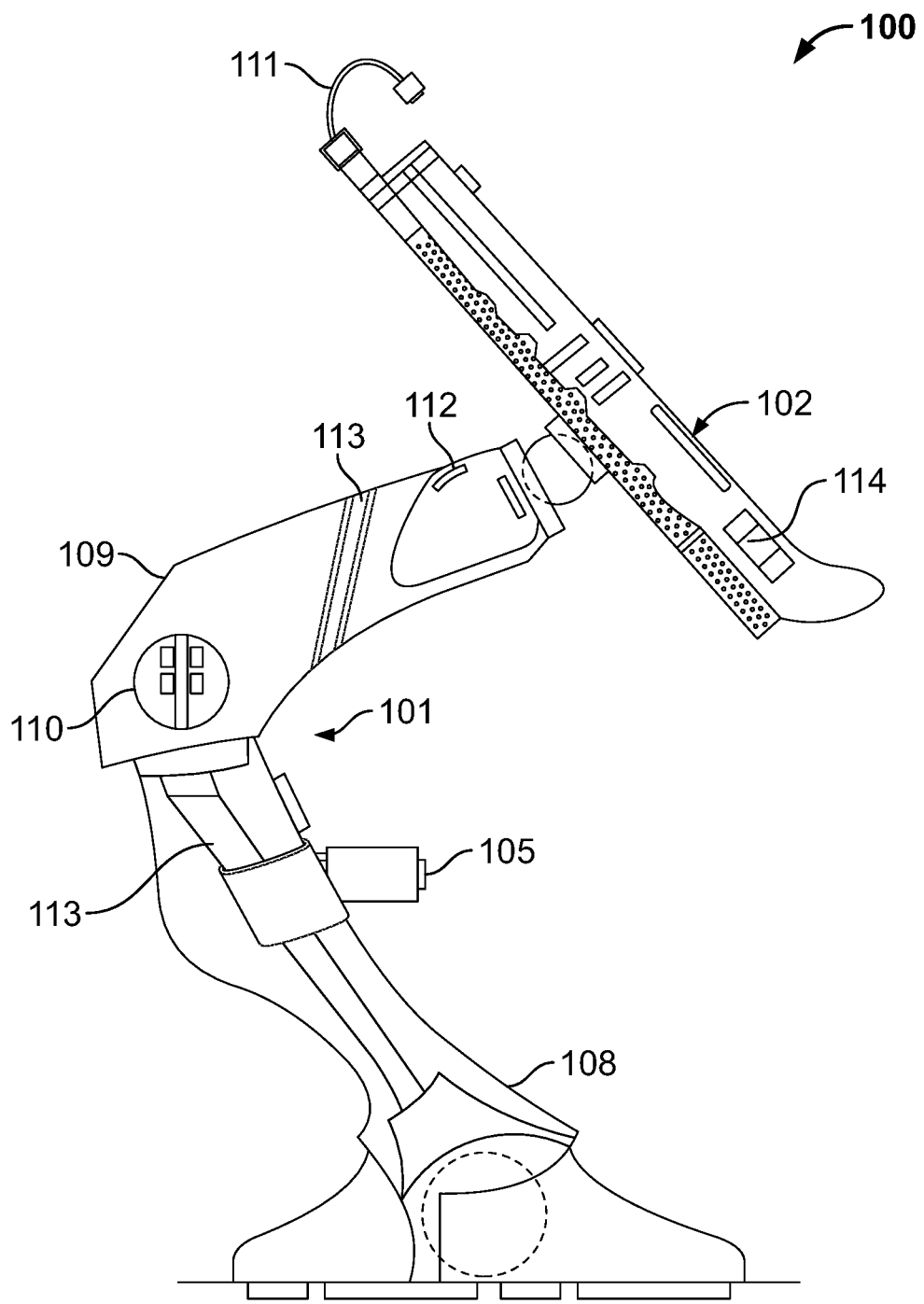
FIG. 2B exemplarily illustrates a side view of a multipurpose easel with an extended storage compartment.

FIG. 2B exemplarily illustrates a side view of a multipurpose easel with an extended storage compartment 105. The multipurpose easel 100 comprises the detachable support assembly 101, the rectangular base element 102, the primary support member 108, and the intermediate support member 109, positioning actuator 110, and retractable light element 111 as disclosed in the detailed description of FIG. 2A. The storage compartment 105 provided in the primary support member 108 is push open type compartment. When the storage compartment 105 must be accessed, the storage compartment 105 is pushed to bring the storage compartment 105 into an extended state as exemplarily illustrated in FIG. 2B. The storage compartment 105 may be provided with additional light emitting diodes 113 (LEDs). In accordance with an embodiment, the rear of the rectangular base element 102 is provided with a foam gripping member configured to enable the operator to firmly grip the rectangular base element 102. The built-in pencil sharpener 112 also comprises a waste compartment configured to collect leftover waste. A release button of the waste compartment allows the operator to easily remove the collected waste.

Figure 3:
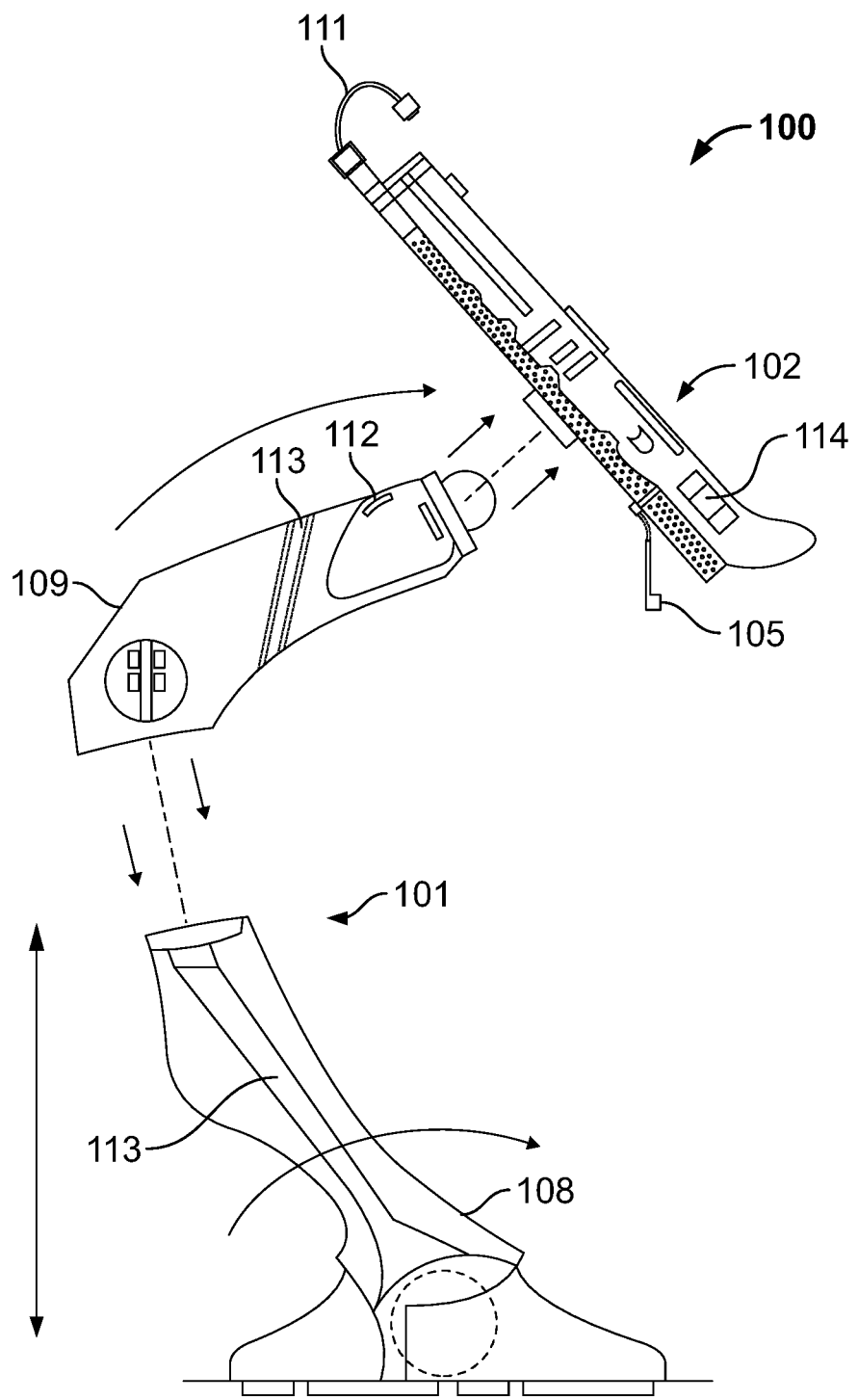
FIG. 3 exemplarily illustrates an exploded view of a multipurpose easel.

FIG. 3 exemplarily illustrates an exploded view of a multipurpose easel 100. The multipurpose easel 100 comprises the detachable support assembly 101, the rectangular base element 102, the primary support member 108, the intermediate support member 109, the positioning actuator 110, the retractable light element 111, the pencil sharpener 112, the light emitting diodes 113 (LEDs), and the dimmer switch 114, as disclosed in the detailed description of FIGS. 2A-2B. The primary support member 108 is configured to grip an external surface via rubber grips provided on a lower surface of the primary support member 108. Further, the primary support member 108 can be rotated 360 degrees. The intermediate support member 109 is detachably attached to the primary support member 108 at one end and the generally rectangular base element 102 at the other end. The intermediate support member 109 is configured to move in an upward and a downward direction. The intermediate support member 109 is configured to rotatably position the generally rectangular base element 102 base on the preference of the user as the intermediate support member 109 is detachably attached to the generally rectangular base element 102 via the ball and socket joint. In accordance with an embodiment, an additional storage compartment 105 is provided on or in the rectangular base element 102 as exemplarily illustrated in FIG. 3. The storage compartment 105 is configured to extend and retract based on user preference. Further, the storage compartment 105 can store 12 or more bottles of paint. Base element 102 can be removable and include a tripod member on its rear side to allow it to stand on its own. Paper can be stored within base element 102. All the elements of the present invention can be rotated depending on the portrait or landscape orientation of the device. Support member 108 can be raised using a pedal using an electric motor or a hydraulic system. Intermediate support member 109 can rotate 360 degrees with respect to primary support member 108.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A multi-purpose easel, comprising:
a support assembly having a primary support member that is mounted at an acute angle to an intermediate support member, said support assembly is detachably mounted to a base element with perimeter sides, said base element includes a lightbox adapted to provide a tracing surface, said base element is mounted to said support assembly using a top ball and socket joint configured to swivel said base element into portrait or landscape mode and rotate 360 degrees, said base element having a front side and a rear side, said rear side includes a foam support member, said base element includes a bottom end that extends past a bottom distal end of said foam support member, said bottom end extends away from said foam support member, at least one storage compartment mounted to lateral edges of said base element, said at least one storage compartment being parallel to said lightbox, said base element has a width, said base element has a ruler extending entirely along said width, said at least one storage compartment being above said ruler, said top ball of said top ball and socket joint being visible when said base element is secured to said support assembly, said top ball being slightly recessed within said base element and said support assembly, said primary support member extending vertically, said intermediate support member extending horizontally, said primary support member having a foot portion at a lower portion thereof to make contact with a ground surface, said foot portion having a foot width greater than an intermediate portion width, said primary support member swiveling forward and backwards on said foot portion, said primary support member including an extended storage compartment, said extended storage compartment being a push open compartment, said extended storage being pushed to bring said extended storage compartment into an extended state, said base element, said primary support element and said intermediate support member each including a light emitting diode, said light emitting diode extending vertically, said base element further including a retractable light element at an upper end of said base element that shines light downwardly on said base element, when said retractable light element is to be stored it is pushed into a cavity located within said base element at said upper end.

2. The multi-purpose easel of claim 1 wherein said base element is rectangular.

3. The multi-purpose easel of claim 1 wherein said base element includes display surfaces, said display surfaces being mounted at a top corner of said base element.

4. The multi-purpose easel of claim 1 wherein said display surfaces show time, alarms, notes, and/or reminders, said time being displayed using a programmable digital or analog dial.

5. The multi-purpose easel of claim 1 wherein said lightbox uses LED lighting elements.

6. The multi-purpose easel of claim 1 wherein said lightbox is controlled using a dimmer switch, said dimmer switch being mounted on a lateral side of said base element and on a lower portion of said base element, said dimmer switch slidably operated to adjust the illumination of said lightbox.

7. The multi-purpose easel of claim 1 wherein said base element is detachably mounted.

8. The multi-purpose easel of claim 1 wherein said base element includes a bottom end, a tray extending along its entire bottom end.

9. The multi-purpose easel of claim 1 wherein said support assembly is telescopic and is adapted to provide greater height to the multi-purpose easel.

10. The multi-purpose easel of claim 1 further including a USB port adapted to charge mobile devices, said USB port mounted thereon support assembly.

11. The multi-purpose easel of claim 1 wherein said support assembly is collapsed into three segments thereby providing easier transportation and storage.

12. The multi-purpose easel of claim 1 wherein said base element includes a pencil sharpener having a waste basin that receives and stores shavings, said waste basin extending below said pencil sharpener.

* * * * *